United States Patent Office 3,249,866
Patented May 3, 1966

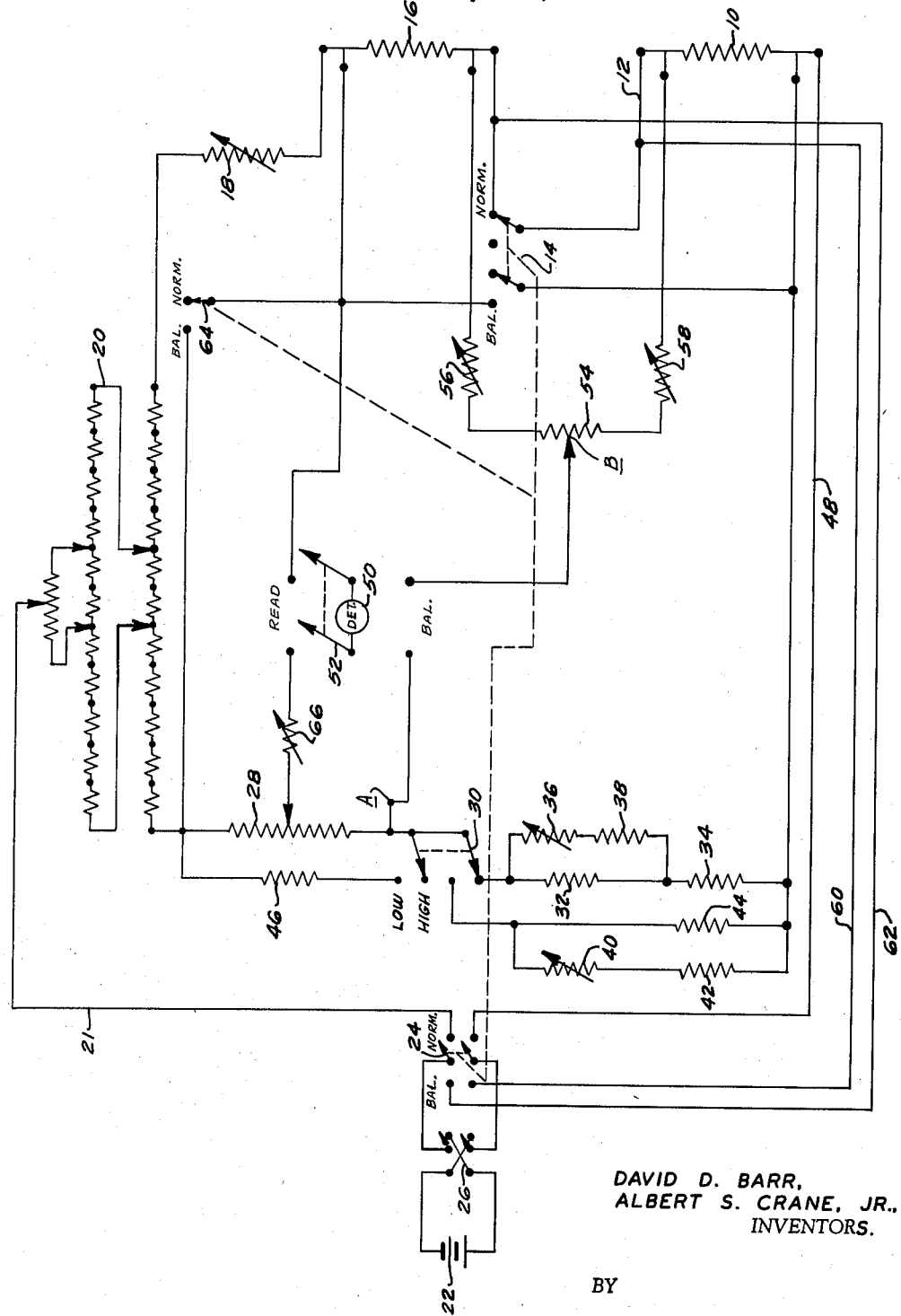

---

3,249,866
DIRECT READING BRIDGE CIRCUIT
David D. Barr, Portland, and Albert S. Crane, Jr., Aloha, Oreg., assignors to Tektronix, Inc., Beaverton, Oreg., a corporation of Oregon
Filed Sept. 13, 1962, Ser. No. 223,451
6 Claims. (Cl. 324—62)

The subject matter of the present invention relates generally to electrical bridge circuits, and in particular to direct reading bridge circuits for measuring resistance in which a decade voltage divider is employed as a readout device to indicate the ratio of the unknown resistor to a standard resistor which has a decade value of resistance, so that the number dial setting of the voltage divider indicates directly the resistance value of the unknown resistor merely by proper placement of a decimal point in such setting number.

The direct readout resistance bridge of the present invention is particularly useful as a test circuit to measure the value of precision resistors with great accuracy. This resistance bridge has several advantages over conventional bridges, including the fact that the dial reading of a voltage divider employed as part of the ratio arm impedance in such bridge, indicates the resistance value of the unknown resistance directly without the need for a separate multiplication calculation to determine such resistance value. Therefore, the measurements obtained by the resistance bridge of the present invention are obtained in an easier and faster manner than conventional high precision bridges. Since mathematical computations are subject to human error, the answer obtained by this direct reading bridge is more reliable than that obtained by a conventional bridge which requires an additional calculation step. In addition, the direct reading resistance bridge of the present invention is more accurate than conventional direct reading bridges since it has less variable contact resistance due to the fact that it employs a fixed standard resistance of a precision decade value, and a Kelvin-Varley divider as a readout device. Also, since the contact resistance of a Kelvin-Varley voltage divider does not vary appreciably, the bridge measurements are reproducible and it is possible to obtain the same resistance reading for two different measurements of the same resistor.

Briefly, the direct reading resistance bridge of the present invention includes a decade voltage divider of the Kelvin-Varley type connected as a first ratio arm impedance in series with a second ratio arm resistance which may, for example, be adjusted so that it is equal to the first ratio arm impedance to provide a 1 to 1 ratio. The circuit also includes a standard resistor of a fixed decade value of resistance connected in series with an unknown resistance and a variable complement resistance. The standard resistor is connected to the second ratio arm impedance and the complement resistance is connected to the first ratio arm impedance so that the two series circuits are connected in parallel. A null detector may be inserted by a selector switch into a circuit extending from a point between the first and second ratio arm impedances to a point between the standard resistor and the unknown resistor in a balance position of such switch in order to balance the bridge by varying the complement resistance until a null reading is obtained on the detector. After the complement resistance is adjusted to balance the bridge, the selector switch is moved to a read position to insert the null detector into a circuit extending from the movable contact of the voltage divider of the first ratio arm impedance to a point between the complement resistance and the unkown resistance. The movable contact dial of the voltage divider is then moved until a null reading is obtained on the detector, and the dial reading of such voltage divider then is taken. This dial reading is a number which is a direct indication of the resistance value of the unknown resistor when a decimal point is placed properly in such number at a position determined by the decade value of the standard resistance. The bridge also includes a balance potentiometer which is used to compensate for any resistance in the connection between the unknown resistance and the standard resistance.

It is therefore one object of the present invention to provide an improved electrical bridge circuit.

Another object of the invention is to provide an improved bridge circuit for measuring resistance quickly and accurately.

A further object of the present invention is to provide an improved direct reading bridge circuit for measuring resistance in which a voltage divider is employed as a readout device by connecting such voltage divider as part of the ratio arm impedance of such bridge and by employing fixed standard resistors of decade values.

Still another object of the present invention is to provide an improved direct reading bridge circuit for measuring resistance which employs a Kelvin-Varley type voltage divider as a readout device to reduce the amount of variable contact resistance of such bridge so that the measurements obtained thereby are extremely accurate.

A still further object of the invention is to provide an improved direct readout bridge circuit for measuring resistance in which a balance potentiometer is employed to compensate for the finite resistance of the conductor connecting the unknown resistor to the standard resistor of such bridge for more accurate results when measuring low resistance values.

Other objects and advantages of the present invention will be apparent in the following detailed description of a preferred embodiment thereof and in the attached drawing, of which:

The figure is a schematic diagram of one embodiment of the electrical bridge circuit of the present invention.

The bridge circuit of the present invention includes a fixed standard resistor 10 which may be one of several decade reference resistors having values of 1, 10, 1,000, 10,000 ohms, etc. One terminal of the standard resistor 10 is connected by the lead wire 12 through a balance switch 14 to one terminal of an unknown resistor 16 whose resistance value is to be measured. The other terminal of the unknown resistor 16 is connected to a complement resistance which may include a variable current rheostat 18 whose series resistance varies in 1 ohm increments with the setting of such rheostat. In order to accurately balance the bridge and reduce variations in contact resistance causing difficulties in obtaining such balance, the complement resistance also includes a complement vernier resistance 20 which is connected at least partly in series with the complement rheostat 18. Thus, the standard resistor 10, the unknown resistor 16, the complement rheostat 18 and part of the complement vernier resistance make a series circuit which forms one side of the bridge circuit.

The complement vernier resistance 20 is constructed in a manner similar to a Kelvin-Varley type voltage divider since it contains three separate voltage dividers connected in parallel. The first stage voltage divider of the complement vernier resistance 20 is constructed in eleven $\frac{1}{10}$ ohm steps while the second stage voltage divider is connected in eleven $\frac{1}{100}$ ohm steps, and the third stage voltage divider is connected as a continuously adjustable potentiometer having a total value of $\frac{1}{100}$ of an ohm. Each of the voltage divider stages of the complement vernier resistance 20 is connected in parallel by connecting the ends of the second and third stages to two movable contacts on each of the first and second stages, respectively. The movable contact on the third stage of the vernier resistance 20 is connected by a lead wire 21 to a voltage source 22 which may be a battery or other suitable source of D.C. voltage, through a balance switch 24 which functions in a manner hereafter described and a switch 26 for reversing polarity of such battery. This connection of the complement vernier resistance 20 places variations of the contact resistance of such of the potentiometers employed in such vernier resistance, in series with the voltage generator so that they do not effect the balance adjustment for such bridge.

The other side of the bridge circuit includes a Kelvin-Varley type decade voltage divider 28 connected to function as part of the first arm of a ratio arm impedance for the bridge. One end of such voltage divider is connected to the end terminal of the first stage of the complement vernier resistance 20 which is remote from the complement rheostat 18 so that a portion of such vernier resistance 20 is in such other side of the bridge circuit. This first ratio arm voltage divider 28 may be connected by means of a selector switch 30 in series with one of two different second ratio arm impedances also forming part of the other side of the bridge circuit. The high impedance ratio resistance includes a pair of series connected fixed resistors 32 and 34, and a variable resistor 36 connected in series with a fixed resistor 38 across the resistor 32. This high impedance ratio resistance is connected in series with the Kelvin-Varley voltage divider 28 when switch 30 is in the "High" position shown so that they form the ratio arm impedance for the divider. Variable resistor 36 may be changed to provide any desired ratio between such ratio arm impedances with the most commonly used being a 1 to 1 ratio. The low impedance ratio resistance connected to the other contact of switch 30 includes a variable resistor 40 connected in series with a fixed resistor 42 and a fixed resistor 44 which is connected in parallel with the series connection of the resistors 40 and 42. When the selector switch 30 is moved to the "Low" position, a low resistance shunt resistor 46 is connected in parallel with the Kelvin-Varley voltage divider 28 to provide a low impedance for the first ratio arm impedance. This first ratio arm impedance is also connected in series with the low impedance ratio resistance including variable resistor 40 which may be adjusted to provide an exact ratio between such impedances. It should be noted that for direct readout the ratio of the upper and lower ratio arm impedances should be a decade ratio of, for example, 10 to 1, 1 to 1, or 1 to 10 etc. since any other ratio would have to be multiplied by the dial reading of the Kelvin-Varley divider 28 to give the resistance of the unknown resistor 16.

The end terminals of the low impedance ratio resistance including resistor 40 and the high impedance ratio resistance including resistor 36 which are remote from the switch 30 are connected together to the end terminal of the standard resistance 10 remote from switch 14. In the normal position "Norm." of balance switch 24, the voltage source 22 is connected by a lead wire 48 to the common connection of the standard resistance 10 and the low impedance ratio resistor 44 and the high impedance ratio resistor 34.

A conventional null detector 50 is connected to the circuit by means of a selector switch 52 having a balance position "Bal." or a read position "Read." In the balance position of the switch, such detector is inserted in a circuit extending from a point A between the upper and the lower ratio arm impedances to a point between the standard resistance 10 and the unknown resistance 16. For large resistance values of the unknown resistor the detector could be connected directly to the lead 12 interconnecting the standard resistor and unknown resistor. However, this lead has some resistance so that for low resistance measurements a balance potentiometer 54 is connected across the lead 12 to compensate for this lead resistance. The movable contact of such potentiometer is connected to one "Bal." position terminal of the selector switch 52. A pair of balance vernier rheostats 56 and 58 are each connected to one of the end terminals of the balance potentiometer 54 between such potentiometer and the unknown resistance 16 and the standard resistance 10, respectively. In order to assure an accurate reading the movable contact of the balance potentiometer 54 is positioned at a point B on such potentiometer where the resistance between the unknown resistance 16 and the point B has the same ratio of impedance to the resistance between the standard resistance 10 and the point B as the ratio of the unknown resistance has to the standard resistance. This is accomplished by moving the switch 24 from the normal position shown to the balance thereby connecting the voltage source 22 through lead lines 60 and 62 across the series connection of balance vernier rheostats 56 and 58 and balance potentiometer 54. At the same time a switch 64 connected across the complement rheostat 18 and complement vernier resistance 20, is closed from the normal open position shown to its balance position "Bal." thereby short-circuiting such complement resistances. The balance switch 14 is ganged to switch 24 and switch 64 so that it is also moved from the normal position shown to the balance position thereby open-circuiting the lead 12 and connecting together the terminals of the unknown resistor 16 and the standard resistance 10 which are remote from the lead 12. This also connects the detector 50 in series with the voltage divider 28 between the point B on the balance potentiometer 54 and the interconnected end terminals of the standard resistance 10 and the unknown resistance 16 which are remote from the conductor 12. Then the movable contact on the potentiometer 54 is moved until a null is obtained on the detector 50. Once a null reading is obtained, the Kelvin balance of the potentiometer 54 need not be further adjusted and switches 14, 24 and 64 are moved back to their normal positions.

After this initial balance step of adjusting the balance potentiometer 54 and after the switches 14, 24 and 64 have been moved back to their normal position, the complement rheostat 18 and the complement vernier resistor 20 are adjusted until a null reading is obtained on the detector 50 while the switch 52 is still in the balance position. This sets the voltage at the point B on the balance potentiomeetr 54 at the same voltage as that of the point A between the first ratio arm impedance including the Kelvin-Varley voltage divider 28 and the second ratio arm impedance. Next, the detector 50 is inserted in a circuit extending from the movable contact of the Kelvin-Varley voltage divider 28 to the point between the complement rheostat 18 and the unknown resistance 16 by moving the selector switch 52 to the position labeled "Read." While a standard Kelvin-Varley voltage divider 28 includes an equivalent variable resistance, indicated as resistor 66, connected in series with the movable contact of such divider due to the inherent nature of the Kelvin-Varley divider, no current flows through this resistance when a null reading is obtained on the detector so that it does not effect the resistance measurement. After the switch 52 is moved to the read position, the movable contact of the Kelvin-Varley voltage divider 28 is moved to produce a null reading on the detector 50.

After the first balance step with all of the switches 14, 24, 52, and 64 in the balance position and a null reading on detector 50 obtained by adjusting the balance potentiometer 54 and the vernier resistance 56 and 58, a balanced bridge circuit is provided in which $$\frac{Rx}{Rs} = \frac{Rbx}{Rbs} \qquad \text{(Equation 1)}$$

where $Rx$ is the resistance of the unknown resistor 16, $Rs$ is the resistance of the standard resistor 10, $Rbx$ is any resistance between the unknown resistor and the point B on the potentiometer 54 including contact and lead resistances as well as the resistance of the vernier resistor 56 and part of the potentiometer 54, and R*bs* is similarly any resistance between the standard resistor 10 and the point B. This relation holds for any condition of the circuits in which the current through R*x* equals the current through R*s* and the current through R*bx* equals the current through R*bs*. Under the same conditions it is easily shown that Equation 1 may be changed to $$\frac{Rx}{Rs} = \frac{Rx + Rbx}{Rs + Rbs} \qquad \text{(Equation 2)}$$

As stated above the second balance step makes the voltage at point A equal to the voltage at point B and, when the detector 50 is then inserted between the movable contact of the resistor 28 and the terminal of the unknown resistor 16 remote from the point B and a null reading obtained during the read step, neither of the two balances referred to above are disturbed. This means that the voltage between point A and the movable contact of the resistor 28 equals the voltage between the point B and the terminal of the unknown resistor 16 remote from the point B. It also means that the following relationship has been established:

$$\frac{DR1}{R2} = \frac{Rx + Rbx}{Rs + Rbs} \qquad \text{(Equation 3)}$$

where R1 is the resistance of the first ratio arm impedance including resistor 28, D is a dial reading on a resistor 28 indicating the percentage of the resistance between the movable contact on the resistor 28 and the point A, and R2 is the resistance of the second ratio arm impedance. If R1 is made equal to R2 during the preliminary calibration of the bridge, then Equation 3 may be changed to $$D = \frac{Rx + Rbx}{Rs + Rbs} \qquad \text{(Equation 4)}$$

Connecting the lead 12 by the switch 14 across the terminals of the series circuit including the potentiometer 54 and the vernier resistors 56 and 58 during the second balance step and the read step will reduce the current through such series circuit, but any current through such series circuit due to a voltage produced by a voltage drop across the lead 12 as a result of lead or contact resistance still results in the current through R*bx* being equal to the current through R*bs*. Also the current through R*x* still equals the current through R*s*.

By substituting Equation 2 in Equation 4, the following relationship is obtained:

$$D = \frac{Rx}{Rs}$$

or $$Rx = DRs$$

Thus the resistance of the unknown resistor 16 can be read directly off the dial of the voltage divider 28 by proper placement of the decimal point according to the decade resistance value of the standard resistor 10. Using different ratios of R1 to R2 so long as the ratio used is an integral power of 10 including zero and minus powers, will merely require the shifting of the decimal point of D and the same is true of using different values for the standard resistor R*s* so long as the value of resistance used is a similar power of 10. It is to be noted that any contact of lead resistances in the complement resistor 18 or complement vernier resistor 20 do not affect the results obtained or the values of such resistances do not appear in the above equations.

It will be obvious to those having ordinary skill in the art that various changes may be made in the details of the above-described preferred embodiment of the present invention to the preferred embodiment and that scope should only be determined by the following claims.

We claim:

1. A direct reading bridge circuit for measuring impedance comprising:
   a standard impedance;
   an unknown impedance having one terminal connected to said standard impedance;
   a complement impedance including a variable impedance, connected to the other terminal of said unknown impedance to form a first series circuit with said standard impedance, said unknown impedance and said complement impedance;
   a first ratio arm impedance including a voltage divider potentiometer, said first impedance having one terminal connected to said complement impedance;
   a second ratio arm impedance having one terminal connected to said standard impedance and another terminal connected to the other terminal of said first impedance so that said second impedance is connected in series with said first impedance to form a second series circuit which is connected in parallel with said first series circuit;
   a voltage source connected across both of said series circuits;
   null detector means for indicating a balanced bridge circuit;
   means for connecting said null detector means in a balance position in a circuit extending from a point between said standard impedance and said unknown impedance to a point between said first impedance and said second impedance, and for connecting said null detector means in a read position in a circuit extending from a point between said complement impedance and said unknown impedance to the movable contact of said voltage divider of said first impedance;
   means for varying said complement impedance to change the series impedance of said first series circuit to balance said null detector means in said balance position; and
   means for varying the movable contact of said voltage divider of said first ratio impedance while maintaining the series impedance of said first and second series circuits constant to balance said null detector in said read position to enable the setting of such movable contact to provide a direct readout of the value of said unknown impedance.

2. A direct reading bridge circuit for measuring resistance, comprising:
   a fixed standard resistance;
   an unknown resistance having one terminal connected to said standard resistance;
   a complement resistance including a variable resistance, said complement resistance being connected to the other terminal of said unknown resistance to form a first series circuit with said standard resistance, said unknown resistance and said complement resistance;
   a first ratio arm resistance including a voltage divider potentiometer which is adjusted in steps and calibrated as a readout device of predetermined value, said first resistance having one terminal connected to said complement resistance;
   a second ratio arm resistance having one terminal connected to said standard resistance and another terminal connected to the other terminal of said first resistance so that said second resistance is connected in series with said first resistance to form a second series circuit which is connected in parallel with said first series circuit;
   a voltage source connected across both of said series circuits;
   null detector means for indicating a balanced bridge circuit;
   means for connecting said null detector means in a balance position from a point between said standard resistance and said unknown resistance to a point between said first resistance and said second resistance, and for connecting said null detector means in a read position from a point between said complement resistance and said unknown resistance to the movable contact of said voltage divider of said first resistance;

means for varying said complement resistance to change the series resistance of said first series circuit to balance said null detector means in said balance position; and means for varying the movable contact of said voltage divider of said first ratio resistance while maintaining the series resistance of said first and second series circuits constant to balance said null detector in said read position to enable the setting of such movable contact to provide a direct readout of the value of said unknown resistance.

3. A direct reading bridge circuit for measuring resistance, comprising:

a fixed standard resistance of a decade value;

an unknown resistance having one terminal connected to said standard resistance;

a complement resistance including a variable resistance which is changed in steps, said complement resistance being connected to the other terminal of said unknown resistance to form a first series circuit with said standard resistance and said unknown resistance;

a first ratio arm resistance including a voltage divider potentiometer of the Kelvin-Varley type which is adjusted in decade steps and calibrated as a readout device, said first resistance having one terminal connected to said complement resistance;

a second ratio arm resistance having one terminal connected to said standard resistance and another terminal connected to the other terminal of said first resistance so that said second resistance is connected in series with said first resistance to form a second series circuit which is connected in parallel with said second series circuit;

a voltage source connected across the parallel circuit formed by said two series circuits;

a null detector for indicating a balanced bridge circuit by a null reading; and switch means for connecting said null detector in a balance position from a point between said standard resistance and said unknown resistance to a point between said first resistance and said second resistance, and for connecting said null detector in a read position from a point between said complement resistance and said unknown resistance to the movable contact of said voltage divider of said first resistance;

means for varying said complement resistance to change the series resistance of said first series circuit to balance said null detector means in said balance position; and means for varying the movable contact of said voltage divider of said first ratio resistance while maintaining the series resistance of said first and second series circuits constant to balance said null detector in said read position to enable the setting of such movable contact to provide a direct readout of the value of said unknown resistance.

4. A direct reading bridge circuit for measuring resistance, comprising:

a fixed standard resistance of a decade value;

an unknown resistance having one terminal connected to said standard resistance;

a complement resistance including a variable current rheostat connected in series with a Kelvin-Varley type voltage divider potentiometer which is adjusted in decade steps, said rheostat being connected to the other terminal of said unknown resistance to form a first series circuit with said standard resistance and said unknown resistance;

a first ratio arm resistance including a Kelvin-Varley type voltage divider potentiometer which is adjusted in decade steps and calibrated as a readout device, said first resistance having one terminal connected to the complement potentiometer;

a second ratio arm resistance having one terminal connected to said standard resistance and another terminal connected to the other terminal of said first resistance so that said second resistance is connected in series with said first resistance to form a second series circuit which is connected in parallel with said first series circuit;

a voltage source connected to the movable contact of said complement potentiometer and to the common connection of said standard resistance and said second ratio resistance across the parallel circuit formed by said two series circuits;

null detector means for indicating a balanced bridge circuit by a null voltage reading;

switch means for connecting said null detector in a balance position from a point between said standard resistance and said unknown resistance to a point between said first resistance and said second resistance, and for alternatively connecting said null detector in a read position from a point between said complement resistance and said unknown resistance to the movable contact of said voltage divider of said first resistance;

means for varying said complement resistance to change the series resistance of said first series circuit to balance said null detector means in said balance position; and means for varying the movable contact of said voltage divider of said first ratio resistance while maintaining the series resistance of said first and second series circuits constant to balance said null detector in said read position to enable the setting of such movable contact to provide a direct readout of the value of said unknown resistance.

5. A direct reading bridge circuit for measuring resistance, comprising:

a standard resistance of a decade value;

an unknown resistance having one terminal connected to said standard resistance;

a balance potentiometer connected at its end terminals between said standard resistance and said unknown resistance;

a complement resistance including a variable resistance which is adjusted in decade steps, said complement resistance being connected to the other terminal of said unknown resistance in series with said standard resistance and said unknown resistance;

a first ratio arm resistance including a voltage divider potentiometer of the Kelvin-Varley type as a readout device which is adjusted in decade steps, said first resistance having one terminal connected to said complement resistance;

a second ratio arm resistance having one terminal connected to said standard resistance and another terminal connected to the other terminal of said first resistance so that said second resistance is connected in series with said first resistance and this series circuit is connected in parallel with the series circuit formed by said standard resistance, said unknown resistance and said complement resistance;

a voltage source connected across the parallel circuit formed by said two series circuits;

null detector means for indicating a balanced bridge circuit by a null reading;

first switch means for connecting said null detector in a balance position from the movable contact of said balance potentiometer to a point between said first resistance and said second resistance, and for alternatively connecting said null detector in a read position from a point between said complement resistance and said unknown resistance to the movable contact of said voltage divider of said first resistance; and second switch means to short-circuit said complement resistance and to short-circuit the series circuit formed by said first resistance and said second resistance, to open-circuit the direct connection between said standard resistance and said unknown resistance, and to connect said voltage source across said balance potentiometer in one position of the switch means, including a switch connected across said balance potentiometer which renders it operative in one position of said switch so that the movable contact of said balance potentiometer may be positioned to divide the resistance of said balance potentiometer into two portions which have the same ratio of impedance as said unknown resistance and standard resistance, when said first switch means is in its balance position.

6. A direct reading bridge circuit for measuring resistance, comprising:

a standard resistance of a decade value;

an unknown resistance having one terminal directly connected to said standard resistance;

a balance potentiometer connected at its end terminals in series between said standard resistance and said unknown resistance and at its movable contact to a switch terminal;

a complement resistance including a variable resistance which is adjusted in decade steps, said complement resistance being connected to the other terminal of said unknown resistance in series with said standard resistance and said unknown resistance;

a first ratio arm resistance including a voltage divider potentiometer of the Kelvin-Varley type as a readout device which is adjusted in decade steps and a low impedance shunt resistance, said first resistance having one terminal connected to said complement resistance;

a second ratio arm resistance including a low impedance ratio resistance and a high impedance ratio resistance, having one terminal connected to said standard resistance and another terminal connected to the other terminal of said first resistance so that said second resistance is connected in series with said first resistance and this series circuit is connected in parallel with the series circuit formed by said standard resistance, said unknown resistance and said complement resistance;

a voltage source connected across the parallel circuit formed by said two series circuits;

null detector means for indicating a balanced bridge circuit by a null reading;

first switch means for connecting said null detector in a balance position from the switch terminal connected to the movable contact of said balance potentiometer to a point between said first resistance and said second resistance, and for alternatively connecting said null detector in a read position from a point between said complement resistance and said unknown resistance to the movable contact of said voltage divider of said first resistance;

second switch means to short-circuit said complement resistance and the series circuit formed by said first resistance and said second resistance, to open-circuit the direct connection between said standard resistance and said unknown resistance, and to connect said voltage source across said balance potentiometer including a switch connected across the balance potentiometer which renders it operative in one position of the switch so that the movable contact of said balance potentiometer may be positioned to divide the resistance of said balance potentiometer into two portions which have the same ratio of impedance as said unknown resistance and said standard resistance; and third switch means to connect said shunt resistance in parallel with the potentiometer of said first resistance and to connect said first resistance in series with the low resistance of said second resistance while open-circuiting the high resistance of said second resistance in one switch position, and to alternatively connect the potentiometer of said second resistance in series with said high resistance while open-circuiting said shunt resistance and said low resistance in another switch position.

References Cited by the Examiner
UNITED STATES PATENTS

| | | | |
|---|---|---|---|
| 1,910,418 | 5/1933 | Zuschlag | 324—62 |
| 1,931,054 | 10/1933 | Butterfield | 324—62 |
| 1,997,164 | 4/1935 | Zuschlag | 324—62 |
| 3,179,880 | 4/1965 | Julie | 324—62 |
| 3,181,061 | 4/1965 | Schneider | 324—62 |

WALTER L. CARLSON, *Primary Examiner.*

C. A. S. HAMRICK, W. H. BUCKLER,
*Assistant Examiners.*